United States Patent [19]
Löndahl et al.

[11] 3,835,764
[45] Sept. 17, 1974

[54] APPARATUS FOR PRODUCING FROZEN MEAT CUBES, HAMBURGERS AND SIMILAR UNITS

[75] Inventors: Göran Stig Löndahl; Lars Inge Eek, both of Halsingborg, Sweden

[73] Assignee: Frigoscandia Contracting AB, Halsingborg, Sweden

[22] Filed: July 25, 1973

[21] Appl. No.: 382,507

Related U.S. Application Data
[63] Continuation of Ser. No. 183,347, Sept. 24, 1971.

[30] Foreign Application Priority Data
Sept. 30, 1970  Sweden............................. 13237/70

[52] U.S. Cl......................... 99/517, 62/374, 99/536
[51] Int. Cl................................................ A23l 3/36
[58] Field of Search ............... 62/63, 374, 375, 380; 99/517, 536; 118/23, 24

[56] References Cited
UNITED STATES PATENTS
1,916,269  7/1933  Kingsbury...................... 99/536

Primary Examiner—Harvey C. Hornsby
Assistant Examiner—Alan Cantor
Attorney, Agent, or Firm—Karl W. Flocks

[57] ABSTRACT

An apparatus for producing frozen meat cubes, hamburgers and similar units comprises a freezing device in which the units are subjected to a reduction of temperature to far below 0°C, and a glazing device arranged after the freezing device, in which cold water is caused to freeze to a glazing on the surfaces of the units. The glazing device comprises a feeding device which imparts to the units leaving the freezing device a relative movement with respect to said device during the feed, and cold water nozzles arranged above and below the path of the feeding device for the units.

2 Claims, 4 Drawing Figures

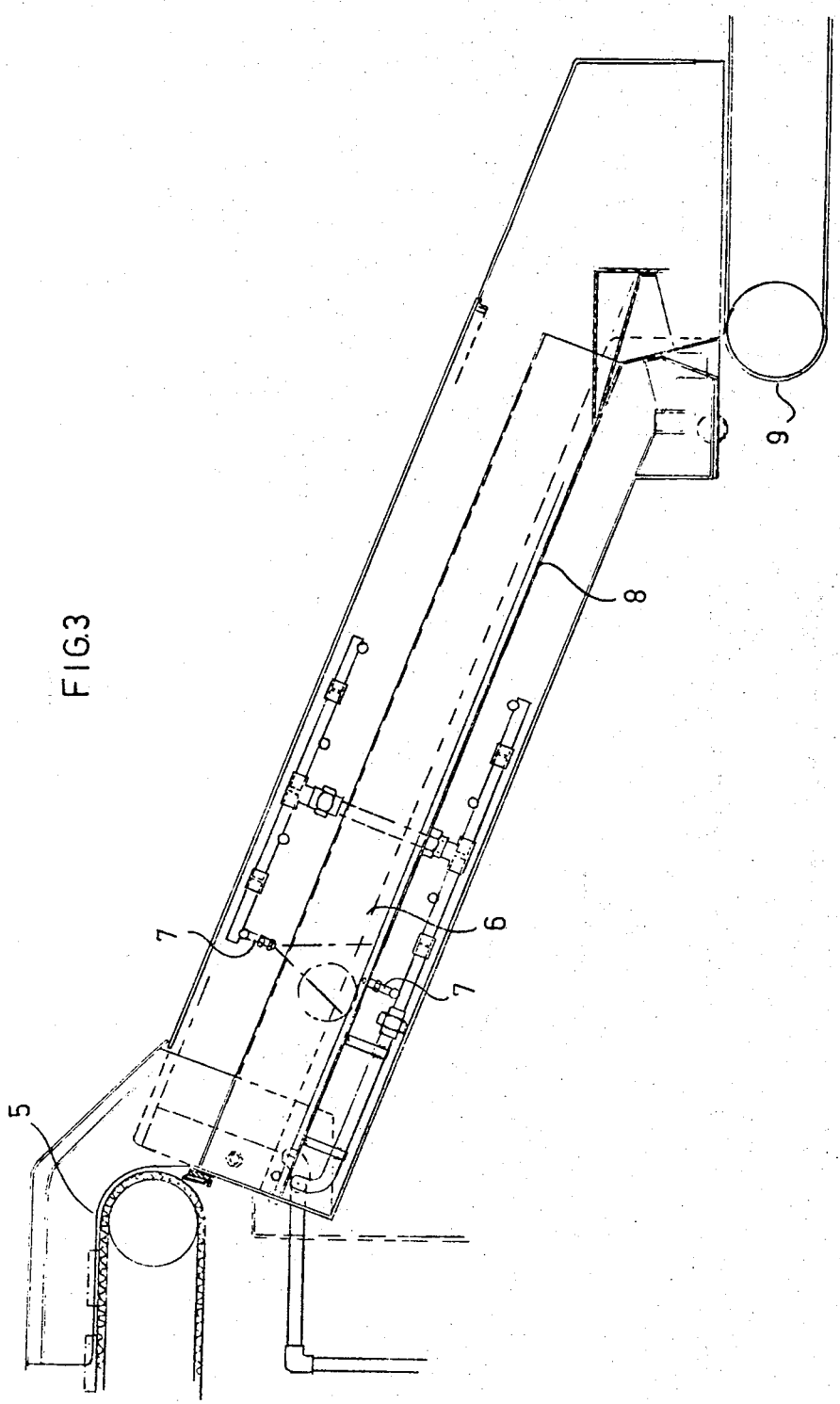

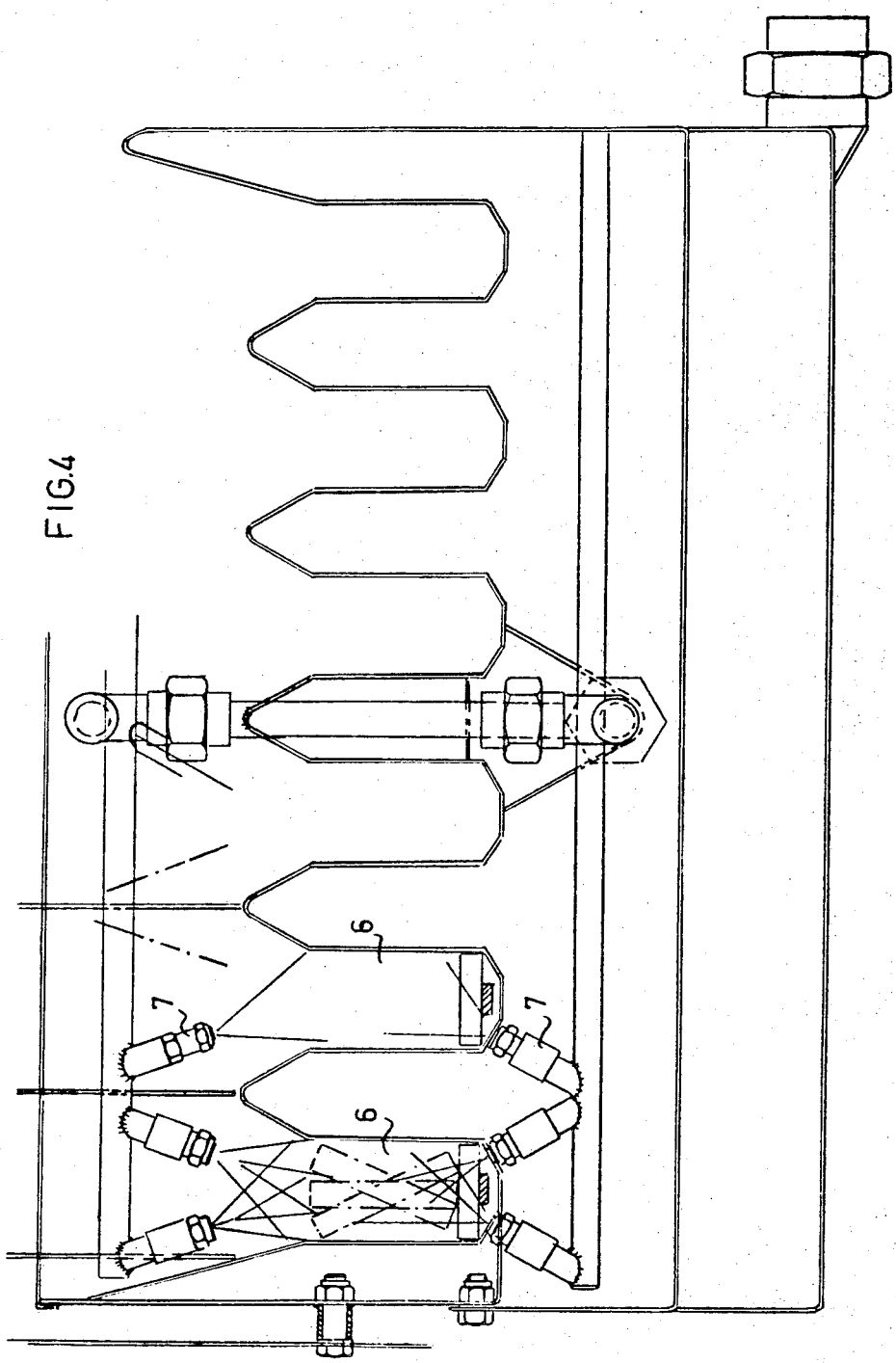

APPARATUS FOR PRODUCING FROZEN MEAT CUBES, HAMBURGERS AND SIMILAR UNITS

This is a continuation, of application Ser. No. 183,347, filed Sept. 24, 1971.

The present invention relates to an apparatus for producing frozen meat cubes, hamburgers and similar units comprising a freezing device in which the units are subjected to a reduction of temperature to far below 0° C, and a glazing device arranged after the freezing device, in which cold water is caused to freeze to a glazing on the surfaces of the units. Characteristic of said apparatus is that the glazing device includes a feeding device imparting to the units leaving the freezing device a relative movement with respect to said device during the feed, and cold water nozzles arranged above and below the path of the feeding device for the units. The invention has thus made it possible to provide the units with a glazing continuously extending all over the surfaces, and there is no risk that the units will freeze to the feeding device or to each other in connection with the glazing operation.

When storing meat in a freezer it has been found that various changes arise, which may disadvantageously affect the quality of the meat. Through sublimation of the ice naturally occurring in the surface layer of the meat, the meat surface will be dried up. As the ice is in form of small microscopic crystals, cavities will form in the meat tissue when the crystals disappear. These cavities, which have a very large surface in relation to their volume, are filled up with air and because of that the surface of attack for oxidative changes becomes very large. As oxidative changes may arise in fat tissues as well as in different proteins in the meat, these changes are very important for the loss of quality which appears during storage.

The above described changes mostly arise at the meat surface. Therefore, if the surface is large in relation to the volume these changes will be very important. When meat is finely divided, for instance by being cut into cubes or by being formed into hamburgers, the relation between surface and volume will increase, i.e. shift in an unfavourable direction. These disadvantages are thus completely removed by the glazing operation which prevents on the one hand the ice crystals in the surface layer of the meat from vanishing through sublimation, and on the other hand the access of air to the meat surface. Another advantage of the glazing operation is that it provides meat products having raw surfaces with a natural and consequently attractive meat colour.

The invention will be more fully described in connection with a plant for producing frozen meat cubes. This plant comprises the following units arranged one after the other: cube cutting machine — separator — freezing unit — sorting machine — glazing device — freeze-out belt — packing device.

The raw material preferably consists of blocks adapted to the cube cutting machine. However, any conceivable block dimension can be used by interposing a sawing operation.

To make it possible to cut the raw material into cubes by means of present-day equipment, the temperature must be increased from the storing temperature of about −30° C to a temperature about zero. This tempering is carried out in a so-called tempering tunnel, in which the raw material can be treated in either packed or unpacked state. In the tunnel temperature and relative humidity conditions are controlled according to a predetermined programme in order to provide the desired final temperature. With unpacked blocks it is also made sure that the surface layer of the block is not dried up. The blocks are placed in the tunnel in such a manner that a uniform current of air is attained over all of the blocks. When tempering it is very important that the final temperature is the same throughout the cross section of the block. Thus, the tempering process must provide a temperature difference between the centre and the surface of the block less than 1° C.

Different raw materials require different final temperatures at the tempering procedure to give an optimum result. Thus, the final temperature for beef, veal, pork and mutton is −4° C to ±0.5° C, whereas the final temperature for organs such as liver is −7.5° C to ±0.5° C.

With blocks not fitted to the cube cutting machine the sawing operation is preferably carried out in a sawing device arranged in such a way that a whole block, irrespective of its dimension, can be passed through said device in one run. Sawing is then carried out in premises holding a temperature of −3° C to −4° C.

The cube cutting machine is provided with bins for the blocks fitted to said machine, which makes an almost continuous cutting of cubes possible. For the cutting operation, the meat is pressed into a knife section consisting of two knife sets movable at right angles to each other by means of a piston. After the knife sets an axe operates, which strikes synchronously with the feeding piston. The movements of the axe and the piston can be varied to obtain the desired cube dimension. Like the sawing operation the cube cutting operation is carried out in premises holding a temperature of −3° C to −4° C.

A mechanical chip separator is arranged directly after the cube cutting machine. This separator essentially consists of stainless band-iron pieces placed on their edges, the interstices of which are fixed by the desired cube size. The separator, which can thus be considered to form a grating, is provided with a vibrator.

The object of the separator is to separate defective cubes and small pieces, thereby dispensing with a manual sorting. This separation directly after the cube cutting machine is very important, as these small pieces during transport to the freezing plant would have thawed and required quite a lot of cleaning up work.

A humidifier for the cubes is arranged immediately ahead of the freezing plant in order to reduce the drying up which takes place when the temperature is reduced in the freezing plant. Humidification can preferably be carried out by having the conveyor belt which carries the cubes to the freezing plant travel through a chamber with a high degree of humidity. The high degree of air humidity is obtained by means of an air humidifier installed in the chamber.

The cube freezing plant preferably comprises a fluidising freezer, in which the cubes are kept in a fluidised state by means of an almost straight upwardly directed current of freezing air. The temperature in the freezing plant is reduced to below −20° C and normally to say about −30° C. When the cubes are very small the temperature should be reduced to below −30° C.

Arranged after the freezing plant is a sorting machine, in which small pieces are sorted out before the cubes reach the glazing device, in which the cubes are treated with cold water which because of the cold from the cubes is brought to freeze to a glazing on the surfaces of the cubes. The cold water, which is sprayed on the cubes to glaze them, has a temperature slightly above 0° C. The temperature can thus be about +1° C.

Where admixtures are allowed according to the valid food regulations it is possible to mix into the glazing water antioxidants, such as ascorbic acid, and chemicals which for instance have a favourable effect on the meat colour.

At the glazing there occurs an increase of the temperature in the cube. The size of this increase of temperature is directly dependent on the size of the cube. Thus, a cube with a face of 30 mm provides an increase of temperature of about 8° C, a cube with a face of 20 mm an increase of temperature of about 10°–12° C, and a cube with a face of 10 mm an increase of temperature of about 15°–18° C.

Before packing the cubes the added water must be frozen out in order to prevent the cubes from freezing together in connection with the packing. This freezing out takes place on a combined freeze-out and inspection belt.

The freeze-out time required depends on the size of the cubes. Thus, the freeze-out time for cubes with a face of more than 20 mm is 6 to 10 seconds. For a cube with a face of 10 mm the freeze-out time is 20 to 30 seconds. The freeze-out time determines the length and speed of the freeze-out belt.

The freeze-out belt also serves as an inspection belt so that defective cubes can be sorted out at said belt.

After freezing out and inspection the cubes are packed in a suitable package that can be chosen fairly arbitrarily as regards such qualities as water vapour density and oxygen permeability, since glazing constitutes a good protection against drying out and oxidative changes in the product.

The glazing will multiply the storing time for the product in question. By studying the turnover of the product it is possible directly to adapt the thickness of the glazing layer in such a manner that said layer is almost sublimated when the product is to be consumed, either as a finished product or as a raw material for further treatment.

Some embodiments of the glazing device according to the invention will be described in more detail in the following with reference to the accompanying drawings in which:

FIG. 3 is a side elevation of the glazing device in the other embodiment thereof;

FIG. 4 is a section of the device on a larger scale.

Figure 1:
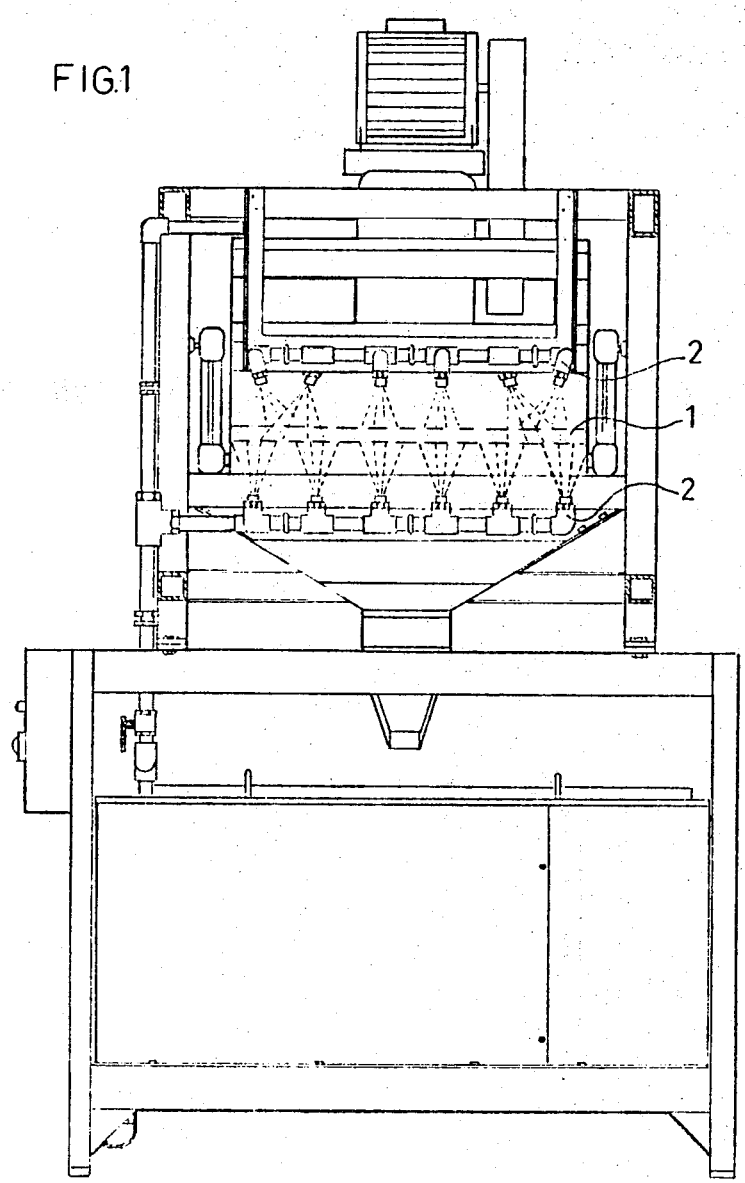
FIG. 1 is a section of the glazing device in one embodiment thereof on line I—I in FIG. 2.
Figure 2:
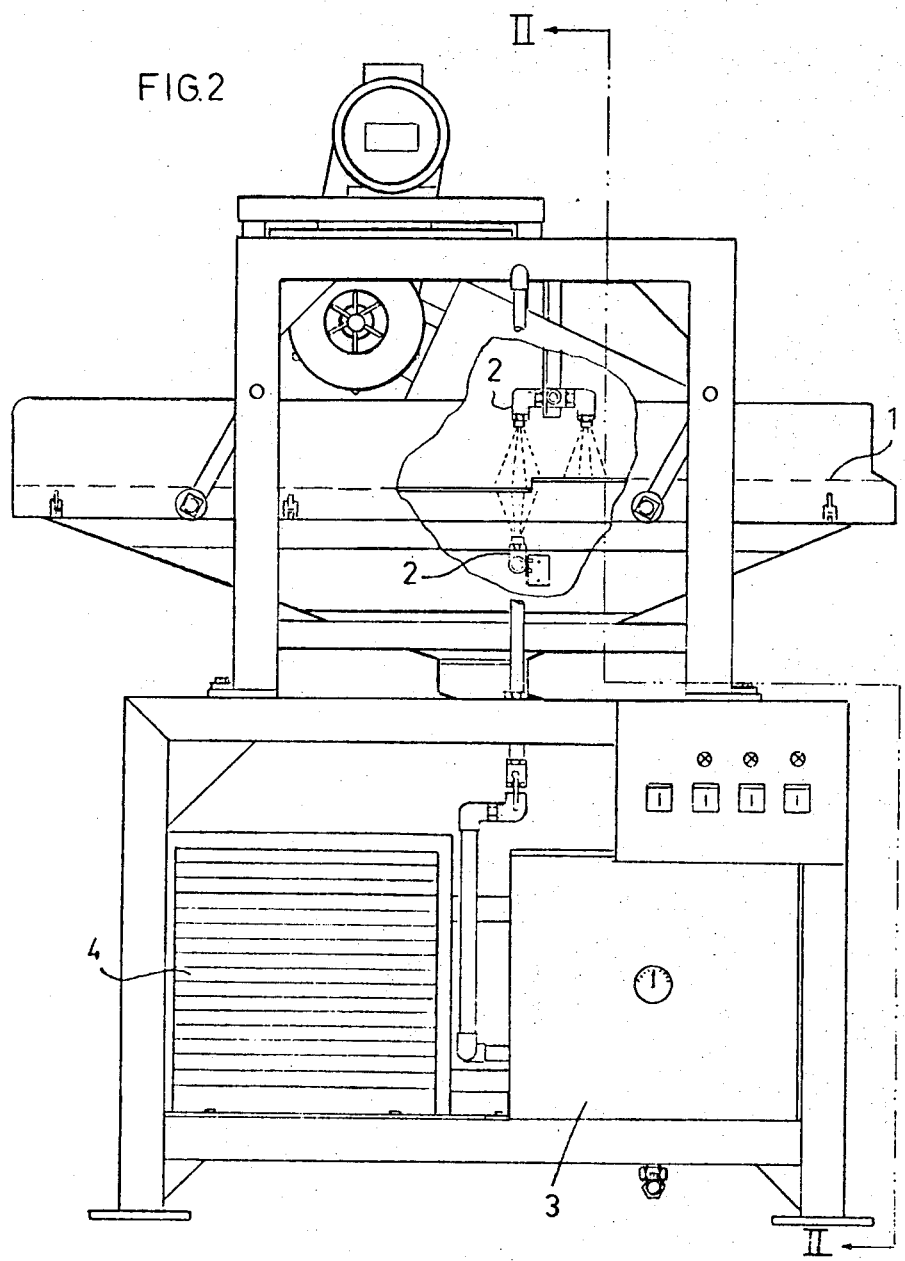
FIG. 2 is a side elevation of the device.

The glazing device according to FIGS. 1 and 2 is intended for meat cubes and similar products, which preferably have been treated in a fluidising freezer. The glazing device comprises an inclined, perforated vibrating table 1, above and below which cold water nozzles 2 are disposed. The vibrating table 1 is arranged to carry the cubes and to impart to them a tumbling movement which guarantees that the surfaces of the cubes are provided with a continuous glazing, at the same time as the cubes are prevented from freezing together.

To obtain said tumbling movement the vibrating table 1 is articulated at the middle. In another embodiment the vibrating table 1 is designed with steps (FIG. 2) to obtain such tumbling movement.

The inclination of the vibrating table is adjustable to permit controlling the processing time and varying the amount of added water. The water amount can also be controlled by means of a number of preferably thermostat-controlled valves ahead of the nozzles 2.

The glazing device includes a water tank 3 from which pipes lead to the nozzles 2 and to which one or more return pipes are connected. Mounted in the water tank 3 are cooling coils which are connected to a refrigerating machine 4. The water is carried from the water tank 3 to the nozzles 2 by means of a pump.

To prevent cubes from bouncing onto the vibrating table 1, which would result in an uneven glazing, the vibrating table 1 is provided with a device decelerating the movement of the cubes at the spot where said cubes are supplied to the table.

The glazing device according to FIGS. 3 and 4 is intended for hamburgers and similar round products preferably coming from a belt-type freezer 5. The feeding device which is an integral part of the glazing device, then comprises several juxtaposed inclined grooves 6 along which the products are arranged to roll. Arranged above and below the grooves 6 are cold water nozzles 7 providing the rolling products all over their surfaces with the continuously extending glazing. The inclination of the grooves 6 is adjustable to permit adjusting the processing time.

The nozzles 7 according to the illustrated embodiment are arranged only at the upper portions of the grooves 6, whereas the lower portions of said grooves 6 are provided with slots or holes 8 for the return water. 9 indicates a freeze-out and inspection belt.

What we claim and desire to secure by letters Patent is:

1. An apparatus for producing frozen round hamburgers and similar round meat units comprising
a freezing device in which the units are subjected to a reduction of temperature to substantially below 0° C, and
glazing means to freeze water to a glazing on the surfaces of the meat units, said glazing means being located downstream from said freezing device and comprising an inclined feeding device down which the round meat units roll down the freezing device, said feeding device comprising a plurality of laterally spaced longitudinally extending deep and relatively narrow grooves, and cold water nozzles arranged above said grooves of the feeding device.

2. An apparatus for producing frozen round hamburgers and similar round meat units comprising
means for freezing said round meat units to a temperature of about −20° C to about −30° C, and
glazing means to freeze water to a glazing on the surfaces of the meat units, said glazing means being located downstream from said freezing means and comprising an inclined feeding device down which the round meat units roll from the freezing device, said feeding device comprising a plurality of laterally spaced longitudinally extending U-shaped grooves, wherein the depth of each said groove is on the order of the diameter of the round meat units which roll down said feeding device and the width of each said groove is substantially less than the depth thereof, and cold water nozzles arranged above said grooves of the feeding device.

* * * * *